Nov. 5, 1929.  W. J. HADDEN  1,734,769
FASTENING MEANS FOR SECURING FABRIC TO A RIGID BASE
Filed Sept. 24, 1927
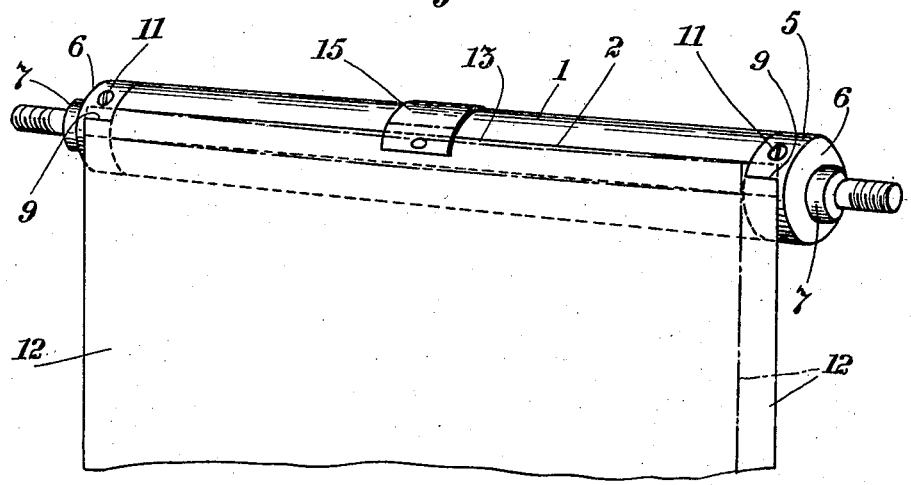
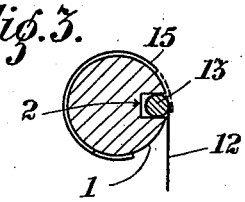
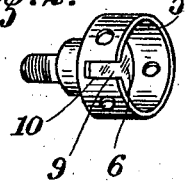 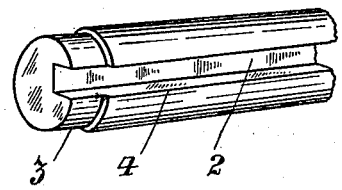
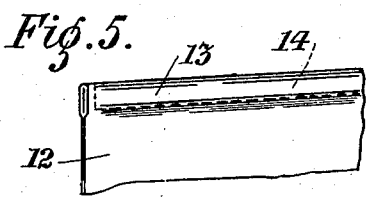
INVENTOR:
William James Hadden,
BY
ATTORNEYS.

Patented Nov. 5, 1929

1,734,769

UNITED STATES PATENT OFFICE

WILLIAM JAMES HADDEN, OF GLASGOW, SCOTLAND, ASSIGNOR TO DONALDSON MANUFACTURING COMPANY LIMITED, OF GLASGOW, SCOTLAND

FASTENING MEANS FOR SECURING FABRIC TO A RIGID BASE

Application filed September 24, 1927, Serial No. 221,675, and in Great Britain June 1, 1927.

This invention relates to fastening means for securing fabric to a rigid base of the type in which the fabric is passed around a locking member which is inserted into a slot in the base and is secured thereto and is more particularly applicable to securing means for securing fabric blinds to blind rollers.

The present invention has for its object to provide a simple, effective and inexpensive fastening means which will allow the fabric to be easily and quickly detached for washing or cleaning, and for replacement when necessary.

According to this invention, the fabric is affixed to a rod or bar of resilient material and the base is provided with a longitudinal open-sided recess to accommodate the rod or bar, a small portion of which recess at each end of the recess has an opening which is narrower than the rod or bar, all being so arranged that one end of the rod or bar can be placed behind the narrow opening at one end, with the fabric passing through the opening and then the other end of the rod or bar is sprung into position behind the narrow opening at the other end, with the fabric at this end also passing through the opening.

Preferably, as stated, the fastening is applied to a roller blind in which case the roller is provided with a rectilinear recess extending axially along the whole length of the periphery of the roller and the narrow opening is formed by providing at each end of the roller a fitting having an annular flanged part which embraces the roller, this flange having a narrow slot therein, disposed above the rectilinear recess in the roller. This fitting may constitute part of one of the usual end fittings for such rollers.

Referring to the drawings:—

Fig. 1 is a perspective view of this invention as applied to a roller blind.

Fig. 2 is an elevation of the roller, the fabric blind, and one of the end fittings detached.

Fig. 3 is a cross section through the centre of the roller.

Fig. 4 is a fragmentary view of the roller.

Fig. 5 is a fragmentary view of the fabric blind where it is affixed to the rod or bar of resilient material.

In the drawings, the blind roller 1 made of wood, is cylindrical in shape and has a longitudinal recess 2 in its periphery, said recess extending the whole length of the roller. The ends of the rollers are rebated at 3 to receive end fittings. As these end fittings are of identical construction only one will be described. The end fitting comprises an annular flange portion 5 adapted to embrace the periphery of the roller, a circular disc portion 6 and a journal portion 7. This end fitting constitutes one part of one of the usual end fittings for such rollers and is associated with means for rotatably supporting and for raising or lowering, or permitting the lowering, of said roller.

The annular flange part 5 is provided with a narrow slot 9, this slot being arranged above the recess 2, with the edge 10 thereof in alignment with the edge 4 of the recessed roller. The end fittings are fixed to the roller by screws 11.

A fabric blind denoted 12 is folded over and sewn to form a looped portion 13 in which is disposed a rod or bar 14 of resilient material such as steel.

The resilient rod can be readily sprung into or out of position for the attachment or detachment to or from the roller by bending the resilient member. When springing the resilient member into position one end thereof is inserted in the recess in the roller beneath the end fitting, at one end, then by binding the resilient member as shown in chain dotted lines in Fig. 1, the other end can also be passed endwise into the recess. As shown the fabric blind extends through the slots in the end fitting.

The term fabric used herein extends to and includes, paper, imitation linen and any other similar material usually used in the art for blinds.

If necessary, as may be, particularly in the case of a long roller, one or more clips may be provided intermediate the ends of the roller, said clips being so arranged that they can be moved so as to engage over the bar or rod and prevent it sagging, and can also be moved away therefrom when it is desired to detach or attach the fabric blind to the roller. The clip may consist of a spring band 15 extending partly around the roller and so arranged as to be substantially flush with the periphery thereof. A projection 16 may be provided on the band to facilitate turning thereof.

I claim:

1. Fastening means for securing fabric to a rigid base comprising, in combination, a base having a longitudinal open-sided recess and having end recesses at both ends of said longitudinal recess opening out by narrow slots to the exterior of the base, a resilient fabric carrying member longer than said longitudinal recess and a piece of fabric so fixed on said carrying member as to enclose the latter, whereby the carrying member and fabric are springable as a whole into and out of the longitudinal recess, the fabric when in the recess extending through said narrow slots and being maintained in a stretched condition by the carrying member.

2. Fastening means for securing fabric to a rigid base, comprising, a base member having a longitudinal recess therein; two end members fitting around and fixedly attached to the base member, one at each end thereof; said members having narrow slots which are in alignment with said longitudinal recess in the base member; a resilient fabric carrying member longer than the distance between said end member and wider than the narrow slots in said end members adapted to be placed endwise beneath one end member and to be sprung by bending behind the other end member and a piece of fabric slightly greater in width than said carrying member having one edge secured around and completely enclosing said resilient member and extending through said recess and through the narrow slots in the end members whereby the resilient fabric carrying member maintains the end of the piece of fabric which is secured thereto in a stretched condition.

3. Fastening means for securing fabric blinds to a blind roller comprising, in combination, a roller base having a longitudinal open-sided recess therein, end members fixedly attached on both ends of the roller base and having narrow slots therein above said longitudinal recess, a resilient fabric blind carrying member slightly longer than the distance between said end members and a piece of fabric so fixed on said carrying member as to completely enclose the latter, whereby the carrying member and fabric are springable as a whole into and out of the longitudinal recess, the fabric when in the recess extending through the narrow slots and being maintained in a stretched condition by the carrying member.

4. The combination of a blind roller having a longitudinal recess therein, fixed end fittings on said roller, bridging the ends of said longitudinal recess and having narrow slots therein, a resilient member longer than the distance between said end fittings and wider than said slots and a piece of fabric having one edge so fixed upon the resilient member that it is maintained stretched thereby, the carrying member and fabric being springable into and out of said longitudinal recess with the fabric when in the recess extending through the slots in the end fittings.

In testimony whereof I affix my signature.

WILLIAM JAMES HADDEN.